(12) United States Patent
Kootaka

(10) Patent No.: US 11,293,822 B2
(45) Date of Patent: Apr. 5, 2022

(54) PRESSURE SENSOR HAVING BASE MEMBER AND HOUSING BEING JOINED TOGETHER AND MANUFACTURING METHOD OF THE SAME

(71) Applicant: NIDEC COPAL ELECTRONICS CORPORATION, Tokyo (JP)

(72) Inventor: Makoto Kootaka, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 38 days.

(21) Appl. No.: 16/895,311

(22) Filed: Jun. 8, 2020

(65) Prior Publication Data

US 2020/0300721 A1   Sep. 24, 2020

Related U.S. Application Data

(63) Continuation of application No. PCT/JP2018/044435, filed on Dec. 3, 2018.

(30) Foreign Application Priority Data

Jan. 30, 2018  (JP) .............................. JP2018-014053
Mar. 23, 2018  (JP) .............................. JP2018-056805

(51) Int. Cl.
*G01L 9/00*   (2006.01)
*G01L 19/14*  (2006.01)

(52) U.S. Cl.
CPC ............ *G01L 9/0055* (2013.01); *G01L 19/14* (2013.01)

(58) Field of Classification Search
None
See application file for complete search history.

(56) References Cited

U.S. PATENT DOCUMENTS 6,212,955 B1 * 4/2001 Tanaka .................. G01L 9/0072
                                                361/283.4
6,536,286 B1   3/2003 Moyer et al.
(Continued)

FOREIGN PATENT DOCUMENTS

JP   S60104743    7/1985
JP   H09257621   10/1997
(Continued)

OTHER PUBLICATIONS

International Search Report for International Application PCT/JP2018/044435, dated Feb. 26, 2019.
(Continued)

*Primary Examiner* — Peter J Macchiarolo
*Assistant Examiner* — Jermaine L Jenkins
(74) *Attorney, Agent, or Firm* — Burris Law, PLLC

(57) ABSTRACT

A metallic base member includes a holding section and a first flange. A sensor chip on which sensor element is arranged is provided on the holding section. An insulating adjusting member is provided on the holding section around the sensor chip and a circumference thereof is positioned between a circumference of the holding section and a circumference of the first flange. A metallic housing includes an opening section and a second flange, an inner surface of the opening section is brought into contact with the circumference of the adjusting member, and the second flange is joined to the first flange.

10 Claims, 6 Drawing Sheets

(56) References Cited

U.S. PATENT DOCUMENTS

| | | | |
|---|---|---|---|
| 2013/0068029 A1 | 3/2013 | Romo et al. | |
| 2019/0033156 A1* | 1/2019 | Takimoto | F25B 49/005 |
| 2020/0182724 A1* | 6/2020 | Takimoto | G01L 9/0054 |
| 2021/0003469 A1* | 1/2021 | Takimoto | G01L 19/0645 |

FOREIGN PATENT DOCUMENTS

| | | |
|---|---|---|
| JP | H10122997 | 5/1998 |
| JP | 3370593 | 1/2003 |
| JP | 2004163321 | 6/2004 |
| JP | 2014510293 | 4/2014 |
| KR | 1020130138667 | 12/2013 |

OTHER PUBLICATIONS

Supplementary European Search Report issued in corresponding EP Application No. 18903201.4, dated Sep. 23, 2021.

* cited by examiner

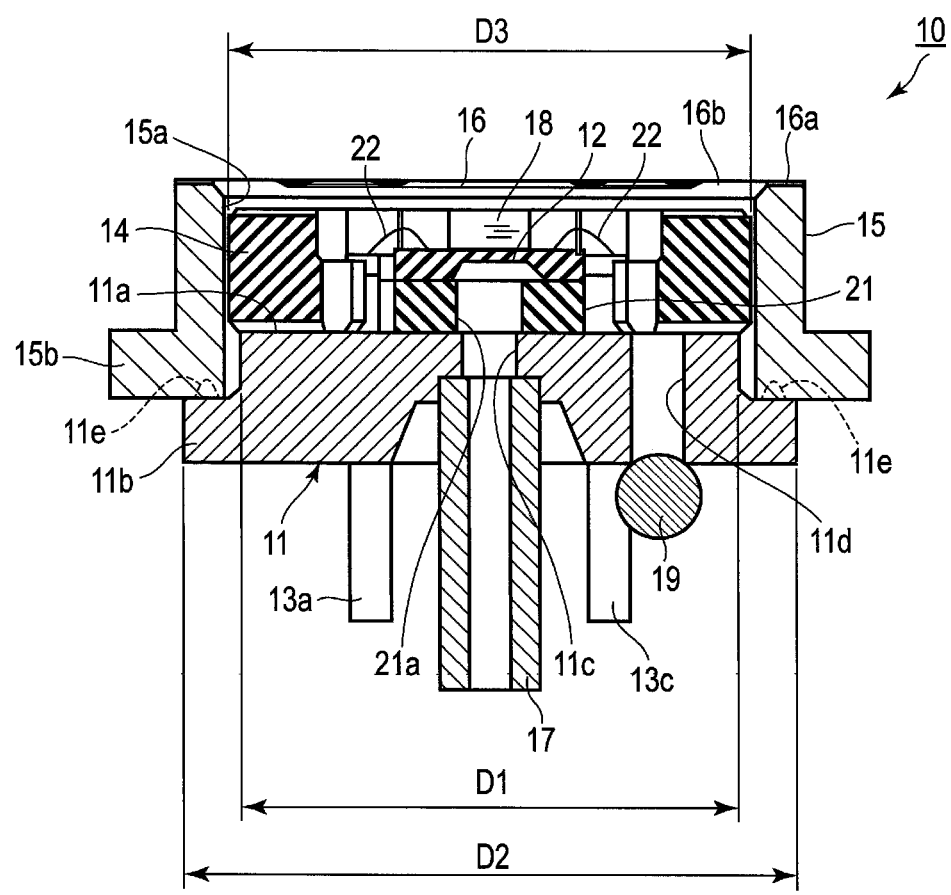
F I G. 4

PRESSURE SENSOR HAVING BASE MEMBER AND HOUSING BEING JOINED TOGETHER AND MANUFACTURING METHOD OF THE SAME

CROSS-REFERENCE TO RELATED APPLICATIONS

This application is a continuation of International Application No. PCT/JP2018/044435, filed on Dec. 3, 2018, which claims priority to and the benefit of Japanese Patent Application No. 2018-056805, filed on Mar. 23, 2018, and Japanese Patent Application No. 2018-014053, filed on Jan. 30, 2018. The disclosures of the above applications are incorporated herein by reference.

FIELD

The present disclosure relates to a pressure sensor configured to detect the pressure of, for example, gases or liquids, and manufacturing method thereof.

BACKGROUND

In a pressure sensor, a housing including, for example, a diaphragm is joined to a base member including a sensor chip, and inside of the housing is filled with an insulating liquid (see, for example, Patent Literature 1 (JP H10-122997 A) and Patent Literature 2 (JP 3370593 B)).

SUMMARY

In the aforementioned pressure sensor, the base member and housing are generally joined to each other by welding. When the base member and housing are joined together by welding, if the centers of the base member and housing are not coincident with each other, an insufficiently welded portion may be caused and, a gap may be created between the base member and housing. Accordingly, when the inside of the housing is filled with an insulating liquid, the liquid may be leaked out from the gap. In order to prevent such liquid leakage from occurring, it is necessary to make the center of the base member and center of the housing coincident with each other, and securely weld the base member and housing together.

An embodiment described herein aims to provide a pressure sensor capable of making it possible to securely make a center of a base member and center of a housing coincident with each other, and securely join the base member and housing together, and manufacturing method thereof.

The pressure sensor of the present embodiments comprises: a metallic base member including a holding section and a first flange provided on a circumference of the holding section; a sensor chip configured to provide on the holding section and to arrange a sensor element thereon; an insulating adjusting member configured to provide on the holding section around the sensor chip, and a circumference of the adjusting member being positioned between the circumference of the holding section and a circumference of the first flange; a metallic housing configured to include an opening section and a second flange, and an inner surface of the opening section being brought into contact with the circumference of the adjusting member and the second flange being joined to the first flange; a diaphragm configured to provide on the housing and to cover the opening section; and a fluid filled into the inside of the housing.

A manufacturing method of the pressure sensor of the present embodiments comprises: preparing a metallic base member including a holding section and a first flange provided at a circumference of the holding section, a sensor chip on which sensor element is arranged, an insulating adjusting member a circumference of which is positioned between the circumference of the holding section and a circumference of the first flange, a metallic housing including an opening section and a second flange, and a diaphragm; providing the sensor chip on the holding section; providing the adjusting member on the holding section around the sensor chip; and bringing an inner surface of the opening section of the housing into contact with the circumference of the adjusting member and joining the second flange to the first flange.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a cross-sectional view along line IV-IV of FIG. 1.

DETAILED DESCRIPTION

Hereinafter, an embodiment will be described below with reference to the accompanying drawings. Elements like or similar to those disclosed in the above embodiment are denoted by similar reference numbers.

FIGS. 1 to 5 each show a pressure sensor 10 according to this embodiment.

Figure 1:
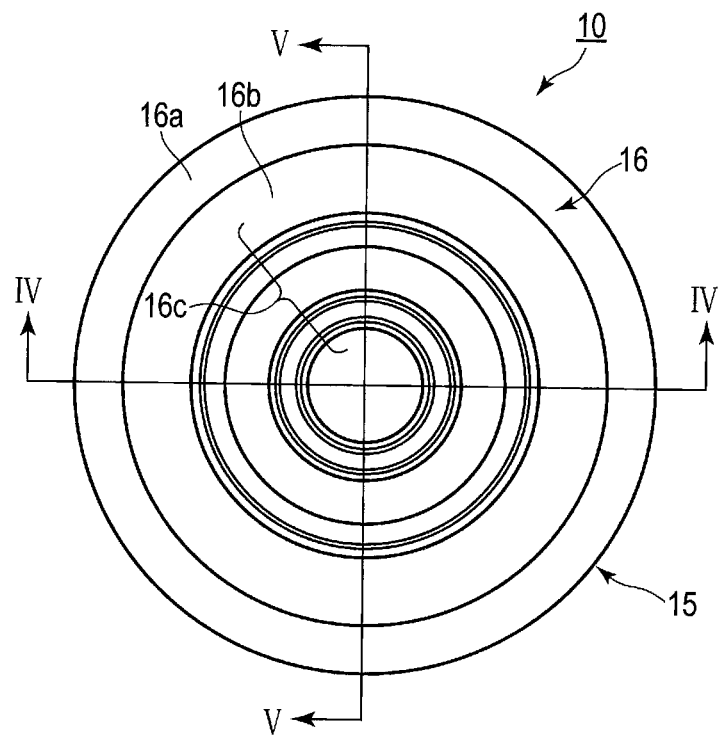
FIG. 1 is a plan view showing a pressure sensor according to an embodiment.
Figure 2:
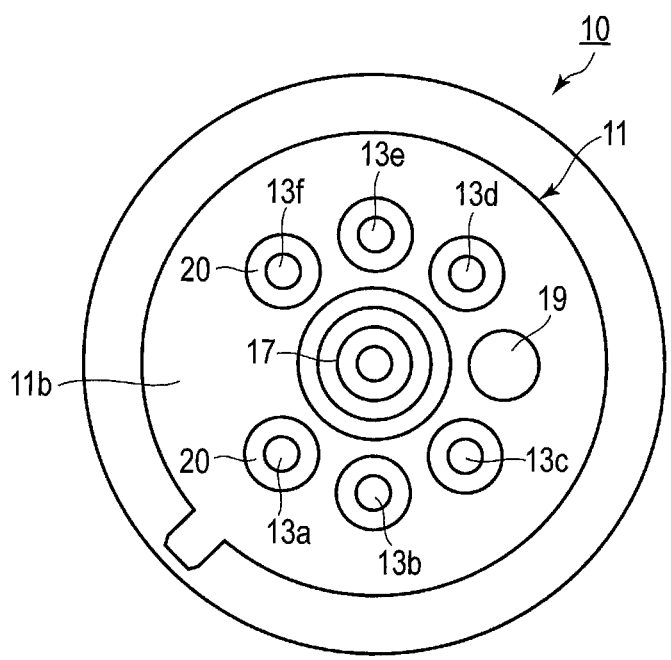
FIG. 2 is a bottom plan view showing the pressure sensor shown in FIG. 1.
Figure 3:
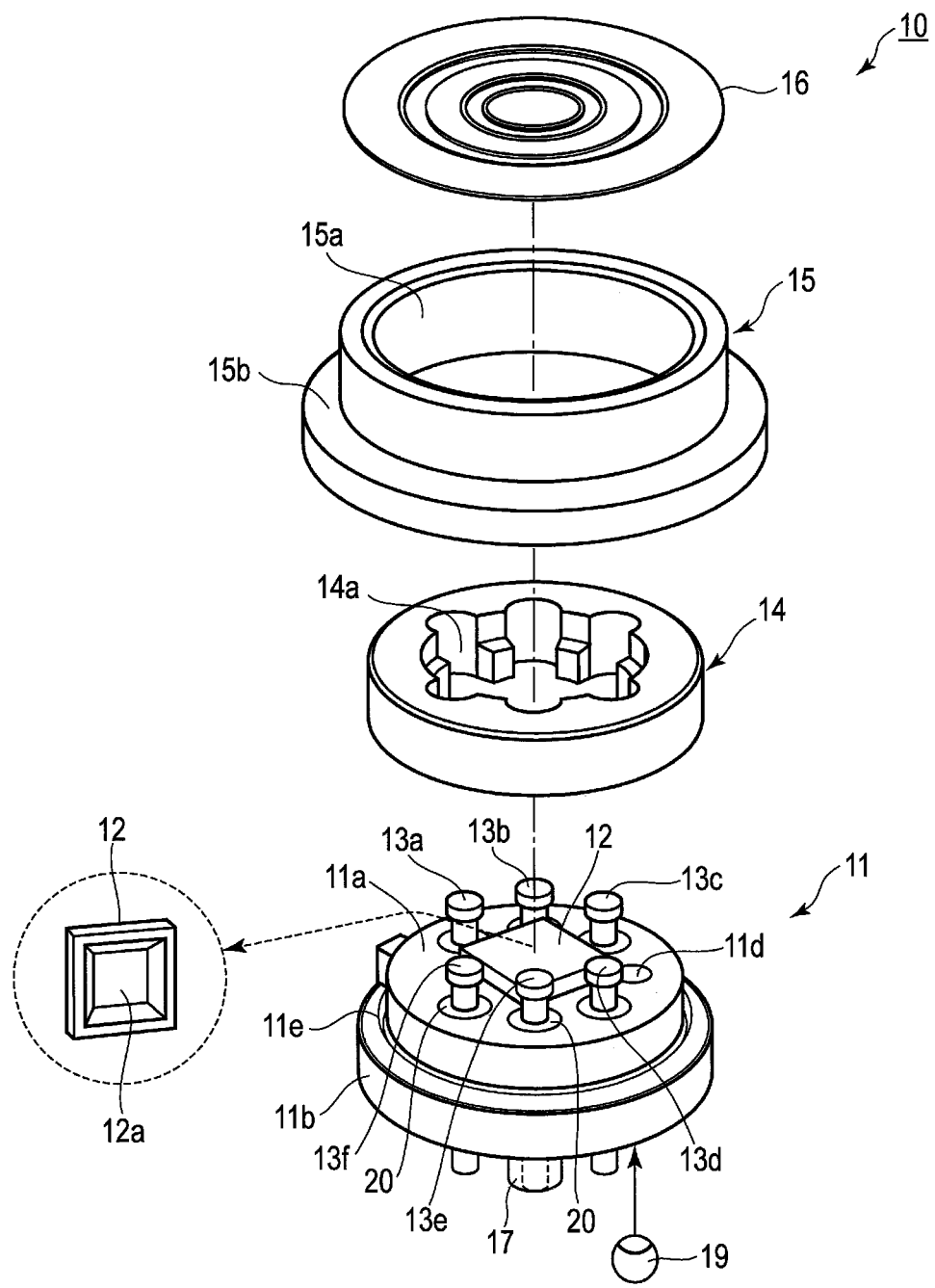
FIG. 3 is an exploded perspective view showing the pressure sensor shown in FIG. 1.

As shown in FIGS. 1 to 3, the pressure sensor 10 comprises a base member 11 called a header, sensor chip 12, a plurality of terminals 13a to 13f, adjusting member 14, housing 15, diaphragm 16, and the like.

The sensor chip 12, plurality of terminals 13a to 13f, and adjusting member 14 are provided on the base member 11, and housing 15 is attached to the base member 11. The diaphragm 16 is attached to the housing 15.

The base member 11 is constituted of a metallic material such as iron, nickel, and cobalt and, in order to enhance the electrical conductivity thereof, is plated with, for example gold. However, the constitution of the base member is not limited to this and, the base member 11 may be constituted of stainless steel or the like.

As shown in FIG. 3 and FIG. 4, the base member 11 comprises a circular holding section 11a having a first diameter D1, and circular first flange 11b having a second diameter D2 greater than the first diameter D1.

The base member 11 includes a first opening section 11c penetrating the holding section 11a from the front surface to the rear surface and inlet 11d. The first opening section 11c is provided at about a central part of the holding section 11a, and inlet 11d is provided in the vicinity of the first opening section 11c.

In the bottom part of the base member 11, a pipe 17 communicating with the first opening section 11c is provided and, air is introduced to the front surface of the holding section 11a through the pipe 17 and first opening section 11c.

The inlet 11d is used to fill the inside of the pressure sensor 10 with an insulating liquid such as silicon oil 18. After filling the silicon oil 18 into the pressure sensor 10, the inlet 11d is sealed up with a metallic ball 19. The metallic ball 19 is formed of a metallic material identical to, for example, the base member 11, and is joined to the undersurface of the base member 11 by welding.

Figure 5:
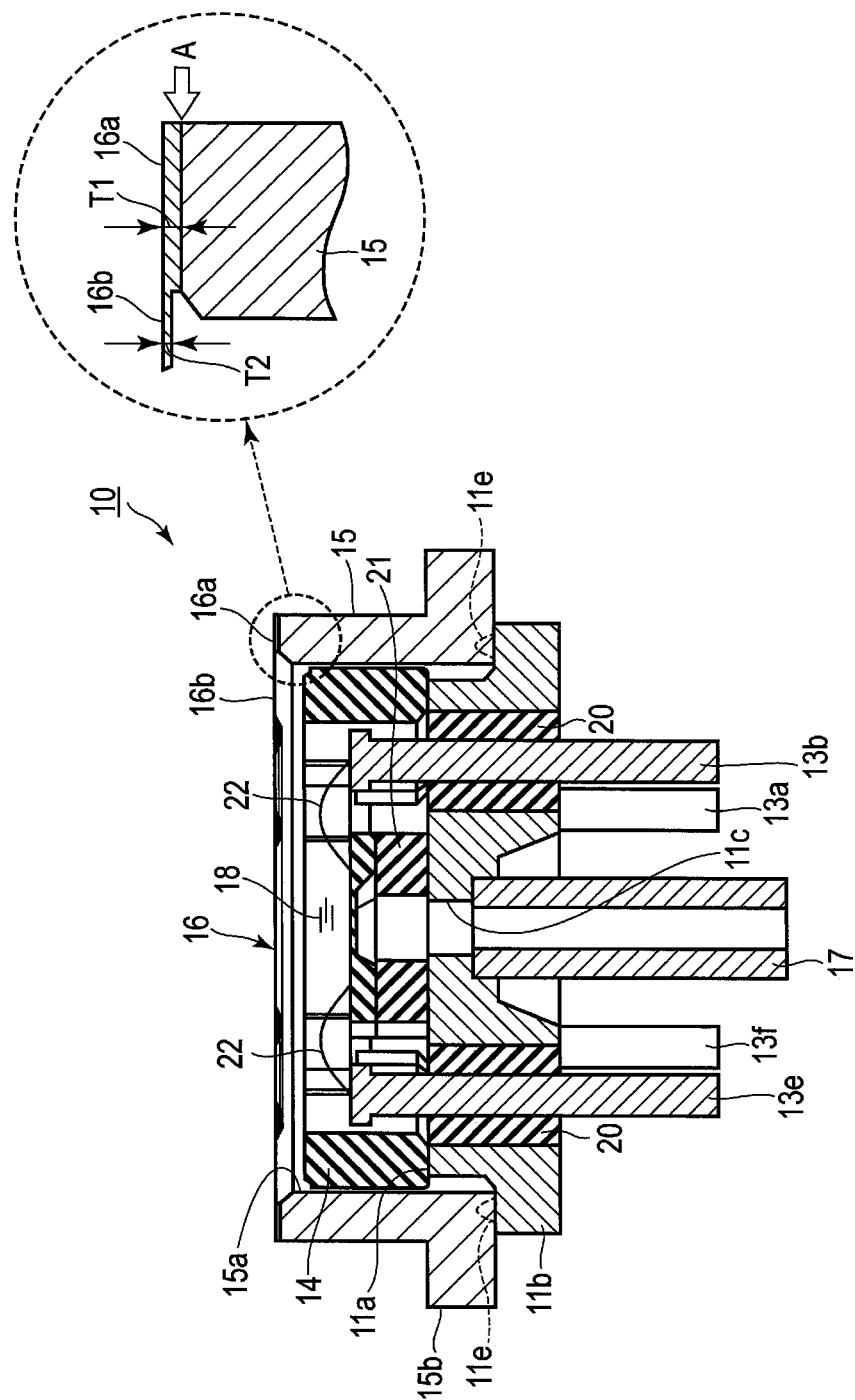
FIG. 5 is a cross-sectional view along line V-V of FIG. 1.

As shown in FIG. 2 and FIG. 5, on the part of the base member 11 around the first opening section 11c, the plurality of terminals 13a to 13f constituted of an electrically conductive metal are held. One end of each of the terminals 13a to 13f is positioned above the front surface of the holding section 11a.

The part between each of the terminals 13a to 13f and base member 11 is filled with, for example, glass 20 serving as an insulating material. The terminals 13a to 13f are insulated from the base member 11 with the glass 20 and, gap between the base member 11 and each of the terminals 13a to 13f is sealed up with the glass 20.

As shown in FIGS. 3 to 5, on the front surface of the first flange 11b of the base member 11, projections 11e to be used for projection welding are provided integral with the first flange 11b. The projection 11e is, for example, triangular in cross section, is separated from the circumference of the holding section 11a by a predetermined distance, and is provided along the entire circumference of the first flange 11b.

The projections 11e need not necessarily be provided on the first flange 11b and may also be provided on a second flange 15b of the housing 15 to be described later.

As shown in FIG. 4 and FIG. 5, at the central part of the holding section 11a, a pedestal 21 made of, for example, glass is provided. The pedestal 21 is provided with a through hole 21a communicating with the first opening section 11c and air is introduced through the through hole 21a.

On the pedestal 21, the sensor chip 12 is provided, and the through hole 21a (first opening section 11c) of the pedestal 21 is sealed with the sensor chip 12. The sensor chip 12 is constituted of, for example, a silicon substrate and, as shown in FIG. 3, is provided with a concave section 12a on the rear surface thereof. Accordingly, the sensor chip 12 is made thin at a part thereof corresponding to the concave section 12a and, the thin area functions as a diaphragm. On the front surface of the sensor chip 12, i.e., on the front surface of the diaphragm, a bridge circuit constituted of a plurality of sensor elements, e.g., Wheatstone bridge circuit is provided.

Figure 6:
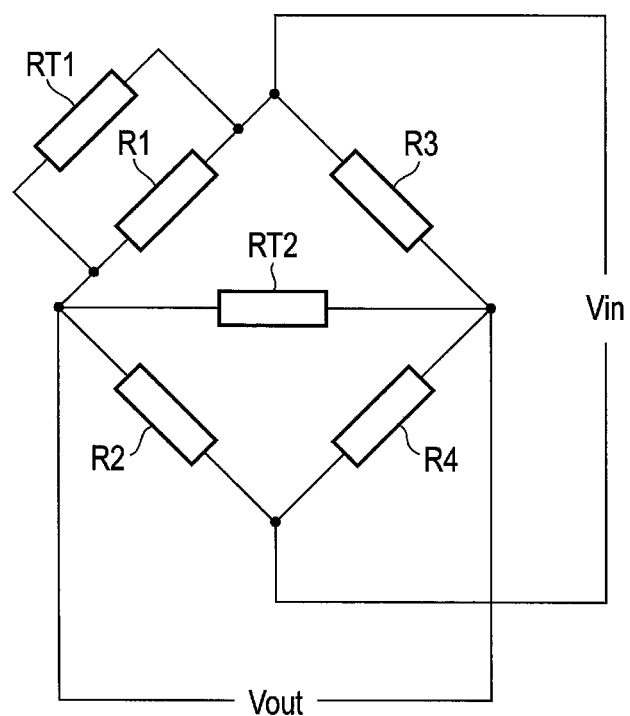
FIG. 6 is a circuit diagram showing an example of sensor elements to be applied to this embodiment.

FIG. 6 shows an example of the Wheatstone bridge circuit to be applied to this embodiment.

Sensor elements R1, R2, R3, and R4 are, for example, piezoresistive elements and are formed on the silicon substrate by, for example, thermal diffusion. Temperature-compensating resistors RT1 and RT2 are, for example, thick film resistors formed on the silicon substrate.

The configuration of the bridge circuit is not limited to the above and can be modified.

Further, the sensor elements R1, R2, R3, and R4 are not limited to the piezoresistive elements formed on the silicon substrate by thermal diffusion and may also be thin-film resistors formed on the silicon substrate and containing, for example, Cr and N.

As shown in FIG. 4 and FIG. 5, the piezoresistive elements R1, R2, R3, and R4, and temperature-compensating resistors RT1 and RT2 all of which function as sensor elements on the sensor chip 12 are connected to the terminals 13a to 13f by using bonding wires 22.

As shown in FIGS. 3 to 5, on the holding section 11a, the adjusting member 14 is provided. The adjusting member 14 is formed of an insulating material, e.g., ceramic. The adjusting member 14 has a function of adjusting the amount of silicon oil 18 contained inside the pressure sensor 10. Accordingly, the adjusting member 14 includes an opening section 14a having such a shape as to fill the space between the sensor chip 12 and each of the terminals 13a to 13f to the extent possible and, the thickness of the adjusting member 14 is determined in such a manner that the adjusting member 14 has the largest possible volume inside the pressure sensor 10.

Furthermore, the adjusting member 14 has a function of making the center of the base member 11 and center of the housing 15 coincident with each other and function of separating the inner surface of a second opening section 15a of the housing 15 to be described later from the circumference of the holding section 11a. For this reason, as shown in FIG. 4, a third diameter D3 of the adjusting member 14 is greater than the first diameter D1 of the holding section 11a and is less than the second diameter D2 of the first flange 11b.

The adjusting member 14 is attached to the base member 11 by using a jig not shown. Accordingly, the center of the adjusting member 14 is made coincident with the center of the base member 11. The adjusting member 14 is fixed to the holding section 11a by using, for example, an adhesive. The fixing method of the adjusting member 14 is not limited to the method using the adhesive.

The housing 15 is substantially cylindrical and includes the second opening section 15a and second flange 15b. Although the housing 15 is formed of a metallic material identical to, for example, the base member 11, the housing 15 may also be formed of other metallic materials.

As shown in FIG. 4, the inner diameter of the second opening section 15a is made approximately identical to the diameter (third diameter) D3 of the adjusting member 14.

The second flange 15b is provided at one end section (lower section) of the cylindrical housing 15 in the longitudinal direction and is provided in parallel with the first flange 11b of the base member 11.

In the state where the housing 15 is attached to the base member 11, the inner surface of the second opening section 15a of the housing 15 comes into contact with the circumference of the adjusting member 14. Accordingly, the center of the housing 15 is made coincident with the centers of the base member 11 and adjusting member 14, and the one end section of the housing 15 in the longitudinal direction is separate from the circumference of the holding section 11a of the base member 11 by a distance (D3−D1)/2.

In the state where the housing 15 is attached to the base member 11, the lower surface (shown in FIG. 4) of the second flange 15b is brought into contact with tip of the projection 11e provided on the first flange 11b of the base member 11. In this state, the base member 11 and housing 15 are joined together by, for example, projection welding.

The second opening section 15a of the housing 15 is sealed up with the diaphragm 16. The diaphragm 16 is constituted of, for example, a metallic material such as stainless steel.

The diaphragm 16 includes a joint section 16a to be joined to the other end section (upper section) of the housing 15 in the longitudinal direction and includes a main body section 16b on the inner side of the joint section 16a. The main body section 16b has a concentric cornice structure 16c. However, the cornice structure 16c is not indispensable and the main body section 16b may have a flat shape.

The main body section 16b is formed by etching a metallic material. As shown in the enlarged part of FIG. 5, the thickness of the metallic material, i.e., the thickness T1 of the joint section 16a is, for example, 50 µm, and thickness T2 of the main body section 16b is made 20 to 30 µm.

More specifically, first, the part of the metallic material corresponding to the joint section 16a is masked with a mask material. When the cornice structure 16c is to be formed, masks corresponding to the cornice structure 16c are formed at parts of the metallic material corresponding to, for example, the main body section 16b. Thereafter, the main body section 16b is subjected to wet etching by means of a chemical solution by using these masks.

The method of forming the cornice structure 16c is not limited to this and it is also possible to form the cornice structure 16c by press work after forming the flat main body section 16b by etching.

The diaphragm 16 formed in this way is joined to the top surface of the housing 15 at the circumference of the joint section 16a by seam welding using, for example, laser light. The arrow A shown in the enlarged part of FIG. 5 indicates the welded position. In this way, the joint section 16a and housing 15 are welded to each other at the boundary part between them.

Figure 7:
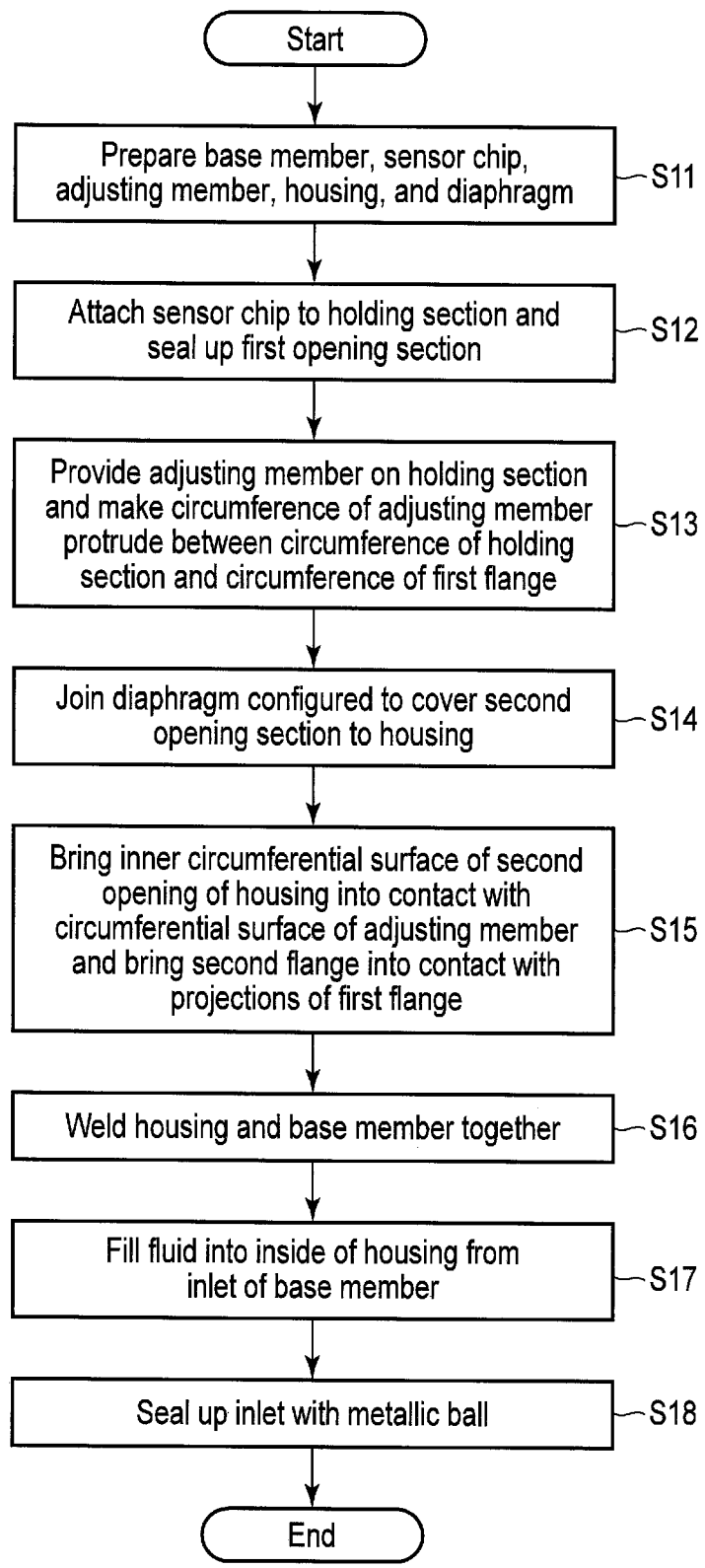
FIG. 7 is a flowchart showing an example of a manufacturing method of this embodiment.

FIG. 7 shows an example of the manufacturing method of the pressure sensor according to this embodiment.

First, the base member 11, sensor chip 12, adjusting member 14, housing 15, and diaphragm 16 all of which have the aforementioned configurations are prepared (S11). The base member 11 may be provided with a plurality of terminals 13a to 13f, pipe 17, glass 20, and pedestal 21.

Next, the sensor chip 12 is attached to the pedestal 21 on the holding section 11a, and first opening section 11c is sealed up with the sensor chip 12 (S12).

The sensor chip may also be arranged in advance on the pedestal 21, and pedestal 21 on which the sensor chip 12 is arranged may also be attached to the part on the holding section 11a.

Thereafter, the adjusting member 14 is provided on the holding section 11a (S13). Regarding the adjusting member 14, the center of the adjusting member 14 is made coincident with the center of the base member 11 by using a jig not shown, and circumference of the adjusting member 14 is positioned between the circumference of the holding section 11a and circumference of the first flange 11b. In this state, the sensor elements on the sensor chip 12 are connected to the terminals 13a to 13f by bonding wires 22.

Thereafter, the diaphragm 16 is attached to the housing 15, joint section 16a of the diaphragm 16 and housing 15 are welded together by seam welding using, for example, laser light, and whole circumference of the diaphragm 16 is joined to the housing 15. Thereby, the second opening section 15a of the housing 15 is sealed up with the diaphragm 16 (S14).

Subsequently, the inner surface of the second opening section 15a of the housing 15 is brought into contact with the circumferential surface of the adjusting member 14, and thus the housing 15 is attached to the base member 11 (S15). In the state where the housing 15 is attached to the base member 11, the lower surface (shown in FIG. 5) of the second flange 15b of the housing 15 is brought into contact with the tip of the projection 11e provided on the first flange 11b of the base member 11.

In this state, when a voltage is applied between the base member 11 and housing 15, a current flows through the part between each of the projection 11e and the second flange 15 to cause Joule heat and melt the projection 11e, whereby the base member 11 and the housing 15 are joined together (S16). That is, the base member 11 and whole circumference of the housing 15 are joined together.

Subsequently, silicon oil 18 is filled into the inside of the housing 15 from the inlet 11d of the base member 11 (S17), and metallic ball 19 is welded to the inlet 11d, whereby the inlet 11d is sealed up with the ball 19 (S18).

It should be noted that in the above process, the diaphragm 16 is welded to the housing 15 and thereafter housing 15 is welded to the base member 11. However, the process is not limited to this and, the diaphragm 16 may also be welded to the housing 15 after the housing 15 is welded to the base member 11.

Advantageous Effects of Embodiment

According to this embodiment, when the adjusting member 14 is provided on the holding section 11a of the base member 11, circumference of the adjusting member 14 is positioned between the circumference of the holding section 11a and circumference of the of the first flange 11b, and housing 15 is attached to the base member 11, the inner surface of the second opening section 15a of the metallic housing 15 is kept in contact with the circumferential surface of the insulating adjusting member 14. Accordingly, the inner surface of the second opening section 15a of the housing 15 is separated from the circumference of the metallic holding section 11a by a fixed interval and is not in contact with the circumference of the holding section 11a. Accordingly, when a voltage is applied between the housing 15 and base member 11, a current is concentrated at a part between the tip of the projection 11e provided on the first flange 11b and second flange 15b of the housing 15 and does not flow through other parts, and hence it is possible to securely weld the housing 15 and base member 11 together at position of the projection 11e. Accordingly, it is possible to enhance the reliability of the welding and prevent the silicon oil 18 contained inside the housing 15 from leaking out to the outside of the housing 15.

It should be noted that joining of the base member 11 and the housing 15 is not limited to the projection welding using the projection 11e and, it is also possible to apply seam welding using, for example, laser light. Even when the seam welding is to be carried out, the centers of the base member 11 and the housing 15 are coincident with each other, whereby it is possible to securely weld the base member 11 and the housing 15 together, and prevent liquid leakage from occurring.

Furthermore, the main body section 16b of the diaphragm 16 is formed by etching a metallic material. Accordingly, it is possible to make the thickness of the diaphragm 16 smaller up to 20 to 30 µm, and enhance the sensitivity of the pressure sensor.

Moreover, the diaphragm 16 includes the joint section 16a at the circumference of the main body section 16b, thickness of the joint section 16a is made greater than the thickness of the main body section 16b, and joint section 16a is joined to the housing 15 by welding. Accordingly, almost all the heat occurring at the time of welding is absorbed by the joint section 16a the thermal capacity of which is greater than the main body section 16b, and hence it is possible to prevent the extremely thin main body section 16b from being deformed, and prevent the sensitivity of the pressure sensor 10 from being lowered.

It should be noted that in the aforementioned embodiment, the base member 11, adjusting member 14, housing 15, and diaphragm 16 are not limited to circular, and may be square or rectangular. Even when the shapes of these members are square (rectangular), it is possible to make the center positions of the base member 11 and housing 15 coincident with each other by using the adjusting member 14 as in the case of the circular shape.

Furthermore, it is sufficient if the shapes of the outer circumference of the adjusting member 14 and inner surface of the second opening section 15a are shapes enabling centering, and it is not necessary for the outer circumference of the adjusting member 14 and inner surface of the second opening section 15a of the housing 15 to be totally in contact with each other. It is sufficient if, for example, the outer circumference of the adjusting member 14 and part of the inner surface of the second opening section 15a of the housing 15 are in contact with each other. In this case, both of point contact and surface contact are allowed. However, since the adjusting member 14 is a member intended to reduce the amount of the silicon oil, it is advantageous because the volume of the adjusting member 14 can be increased when the entire circumference of the adjusting member 14 is in contact with the inner surface of the second opening section 15a of the housing 15.

Further, the aforementioned embodiment has been described with respect to the pressure sensor configured to measure the gage pressure (differential pressure between the object to be measured and atmospheric pressure). However, in the case where the pressure sensor is a pressure sensor configured to measure the absolute pressure, the first opening section 11c of the base member 11, pipe 17, and through hole 21a of the pedestal 21 are omissible.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pressure sensor comprising:
a base member including a holding section and a first flange provided on a circumference of the holding section;
a sensor chip configured to provide on the holding section and to arrange a sensor element thereon;
an insulating adjusting member configured to provide on the holding section around the sensor chip, and a circumference of the adjusting member being positioned between the circumference of the holding section and a circumference of the first flange;
a housing configured to include an opening and a second flange, and an inner surface of the opening being brought into contact with the circumference of the adjusting member and the second flange being joined to the first flange;
a diaphragm configured to provide on the housing and to cover the opening; and
a fluid filled into the inside of the housing.

2. The pressure sensor of claim 1, wherein
the holding section comprises a first diameter, and the first flange comprises a second diameter greater than the first diameter, and
the adjusting member comprises a third diameter greater than the first diameter and less than the second diameter.

3. The pressure sensor of claim 1, wherein
one of the first flange and the second flange includes projections for welding provided along the circumference of the holding section.

4. A manufacturing method of a pressure sensor comprising:
preparing a base member including a holding section and a first flange provided at a circumference of the holding section, a sensor chip on which sensor element is arranged, an insulating adjusting member a circumference of which is positioned between the circumference of the holding section and a circumference of the first flange, a housing including an opening and a second flange, and a diaphragm;
providing the sensor chip on the holding section of the base member;
providing the adjusting member on the holding section of the base member around the sensor chip; and
bringing an inner surface of the opening of the housing into contact with the circumference of the adjusting member and joining the second flange to the first flange.

5. The manufacturing method of a pressure sensor of claim 4, further comprising:
joining the diaphragm to the opening of the housing prior to joining the second flange of the housing to the first flange; and
joining the second flange of the housing to the first flange and, thereafter filling a fluid into the inside of the housing.

6. The manufacturing method of a pressure sensor of claim 5, wherein
the first flange includes projection for welding provided along the circumference of the holding section, the projection and the second flange are brought into contact with each other, a voltage is applied to the base member and the housing whereby the first flange and the second flange are welded together.

7. The manufacturing method of a pressure sensor of claim 5, wherein
the holding section comprises a first diameter, and the first flange comprises a second diameter greater than the first diameter, and
the adjusting member comprises a third diameter less than the second diameter.

8. The manufacturing method of a pressure sensor of claim 4, further comprising:
joining the second flange of the housing to the first flange and, thereafter joining the diaphragm to the opening of the housing; and
filling a fluid into the inside of the housing.

9. The manufacturing method of a pressure sensor of claim 8, wherein the first flange includes projection for welding provided along the circumference of the holding section, the projection and the second flange are brought into contact with each other, a voltage is applied to the base member and the housing whereby the first flange and the second flange are welded together.

10. The manufacturing method of a pressure sensor of claim 8, wherein
the holding section comprises a first diameter, and the first flange comprises a second diameter greater than the first diameter, and
the adjusting member comprises a third diameter less than the second diameter.

* * * * *